(12) United States Patent
Kim et al.

(10) Patent No.: US 8,770,461 B2
(45) Date of Patent: Jul. 8, 2014

(54) PIPE WELDING APPARATUS

(75) Inventors: Jong Jun Kim, Ulsan (KR); Hyeong Soon Moon, Ulsan (KR); Jong Cheol Kim, Ulsan (KR); Yong Baek Kim, Busan (KR)

(73) Assignee: Hyundai Heavy Industries Co., Ltd. (KR)

( * ) Notice: Subject to any disclaimer, the term of this patent is extended or adjusted under 35 U.S.C. 154(b) by 0 days.

(21) Appl. No.: 13/981,988

(22) PCT Filed: Jun. 15, 2012

(86) PCT No.: PCT/KR2012/004743
§ 371 (c)(1),
(2), (4) Date: Jul. 26, 2013

(87) PCT Pub. No.: WO2013/108966
PCT Pub. Date: Jul. 25, 2013

(65) Prior Publication Data
US 2013/0306710 A1 Nov. 21, 2013

(30) Foreign Application Priority Data

Jan. 18, 2012 (KR) ........................ 10-2012-0005624

(51) Int. Cl.
*B23K 37/00* (2006.01)
*B23K 37/02* (2006.01)
(52) U.S. Cl.
CPC ............. *B23K 37/0276* (2013.01); *B23K 37/00* (2013.01)
USPC .............................................. 228/29; 228/30

(58) Field of Classification Search
None
See application file for complete search history.

(56) References Cited

U.S. PATENT DOCUMENTS

| | | | | | |
|---|---|---|---|---|---|
| 3,806,691 | A | * | 4/1974 | Roach | .......................... 219/69.16 |
| 3,904,845 | A | * | 9/1975 | Minkiewicz | ................... 228/176 |
| 4,179,101 | A | * | 12/1979 | Brautigam | ....................... 266/77 |
| 4,480,821 | A | | 11/1984 | Noll et al. | |
| 4,647,749 | A | * | 3/1987 | Koshy | .......................... 219/76.14 |
| 5,986,236 | A | * | 11/1999 | Gainand et al. | ........... 219/121.82 |
| 2011/0186556 | A1 | * | 8/2011 | Heinrich et al. | ............... 219/136 |
| 2012/0000966 | A1 | * | 1/2012 | Greenwall | ..................... 228/256 |

FOREIGN PATENT DOCUMENTS

| | | |
|---|---|---|
| EP | 0082274 A1 | 6/1983 |
| EP | 0180738 B1 | 1/1988 |
| JP | 59016668 | 1/1984 |
| KR | KO200391479 Y1 | 7/2005 |
| KR | KO1020070009275 A | 1/2007 |
| SU | 1459855 A * | 2/1989 |

OTHER PUBLICATIONS

International Search Report; Mailed Jul. 25, 2013 for corresponding PCT Application No. PCT/KR2012/004743.

* cited by examiner

*Primary Examiner* — Kiley Stoner
(74) *Attorney, Agent, or Firm* — Mendelsohn, Drucker & Dunleavy, PC; Kevin M. Drucker; Steve Mendelsohn (57) ABSTRACT

Provided is a pipe welding apparatus, including: a support fixed to the ground; a torch which is supported by the support and is formed to correspond to a welding portion of a pipe; and a first rotation part for rotating the torch in a circumferential direction of the pipe up to a predetermined angle.

7 Claims, 11 Drawing Sheets

PIPE WELDING APPARATUS

CROSS-REFERENCE TO RELATED APPLICATIONS

This application claims priority to Patent Cooperation Treaty Application No. PCT/KR2012/004743, filed on Jun. 15, 2012, which claims priority to Korean Patent Application No. 10-2012-0005624, filed on Jan. 18, 2012, the disclosure of both of which are hereby incorporated by reference into the instant application.

TECHNICAL FIELD

The present invention relates to a pipe welding apparatus, and more particularly, to a pipe welding apparatus which can improve welding operation efficiency.

BACKGROUND ART

In general, when one end of a pipe is welded, a welding portion located on a circumference of the pipe is welded using a welding torch.

However, in a case where a welding apparatus having a regular mechanism rather than a hand-operated welding machine, which is used in a state of being directly held by a worker, is used, a disposition position of the pipe and torch should be correctly arranged so that correct welding can be performed.

In particular, in a case where a welding operation is performed with rotation of the pipe which is an operation member of a welding apparatus fixedly installed in a specific operation area, a regular instrumental position relationship between the torch of the welding apparatus and a welding line of the pipe should be confirmed and a certain posture should be maintained. However, it is problematic that there is no appropriate apparatus to realize it.

DETAILED DESCRIPTION OF THE INVENTION

Technical Problem

The present invention has been made keeping in mind the above problems. An aspect of the present invention provides a pipe welding apparatus, which includes an automatic position regulating device, which can three-dimensionally regulate a position of the torch so that the pipe and the torch of the welding apparatus form and maintain an accurate welding position and can set an initial welding position in the pipe, in a case where in butt welding of the pipe, the pipe rotates and the welding apparatus is fixed to a certain position.

The technical problem to be solved by the present invention is not limited to the technical problem as mentioned above, and another technical problem, which is not mentioned, could be clearly understood by those having ordinary skill in the art to which the present invention pertains based on the description below.

Technical Solution

According to an aspect of the present invention, there is provided a pipe welding apparatus: including a support fixed to the ground; a torch which is supported by the support and is formed to correspond to a welding portion of a pipe; and a first rotation part for rotating the torch in a circumferential direction of the pipe up to a predetermined angle.

At this time, an outer bracket may be detachably formed at the support.

Furthermore, the pipe welding apparatus may further include a second rotation part for rotating the torch in an axial direction of the pipe up to a predetermined angle.

Also, the second rotating part may include: a fixing member attached to the support; a second rotation connecting member for connecting the torch and the fixing member; a screw fixation member connected to the fixing member; a central member which becomes a center of rotation; a second rotation part bolt which is formed to pass through the fixing member and the screw fixation member, and provides a welding force so that the fixing member rotates around the central member.

Also, the second rotation part may further include an elastic member which is formed on an outer circumference surface of the second rotation part bolt.

Also, the pipe welding apparatus may further include a third rotation part for horizontally rotating the torch on the pipe up to a predetermined angle. Also, the third rotation part may include: a third rotation part connecting member formed to be connected to the torch; and a third rotation part bolt which is formed to pass through the support and rotates the torch by applying the welding force to the third rotation part connecting member.

Also, the pipe welding apparatus may further include: a sensor which is formed at the support and enables the torch to be disposed at an initial welding position of the pipe by coming into contact with the pipe.

Also, the sensor may include: a torch supporting part which supports the torch and moves up and down on the support; a contact part which is formed at the torch supporting part to be linked with it and comes into contact with an external surface of the pipe; a limit switch which is formed at the torch supporting part and enables a vertical movement of the torch supporting part to be stopped when the torch is disposed at the initial welding position of the pipe; and a switch operator for operating the limit switch.

Advantageous Effects

According to the present invention, it is advantageous that the pipe welding apparatus enables the pipe and the torch of the welding apparatus to form and maintain an accurate welding position upon a pipe welding process in such a form that the fixed welding apparatus and the pipe which is a target for welding rotates, so that welding can be rapidly performed and a welding defect can be also reduced.

BEST MODE FOR CARRYING OUT THE INVENTION

Hereinafter, preferred embodiments of the present invention will be described in detail with reference to the accompanying drawings. It should be understood that a size or shape of the elements illustrated in the drawings may be exaggeratedly drawn to more clearly and conveniently explain the present invention. Furthermore, the terms specifically defined in consideration of the configuration and operation of the present invention may be changed depending on the intention or practice of a user and an operator. The terms should be defined based on all contents in the specification. The present invention may be embodied in different forms and should not be construed as limited to the embodiments set forth herein. Those having ordinary skill in the art who understand the present invention could easily embody different embodiments which belong to the scope of the present invention.

Figure 1:
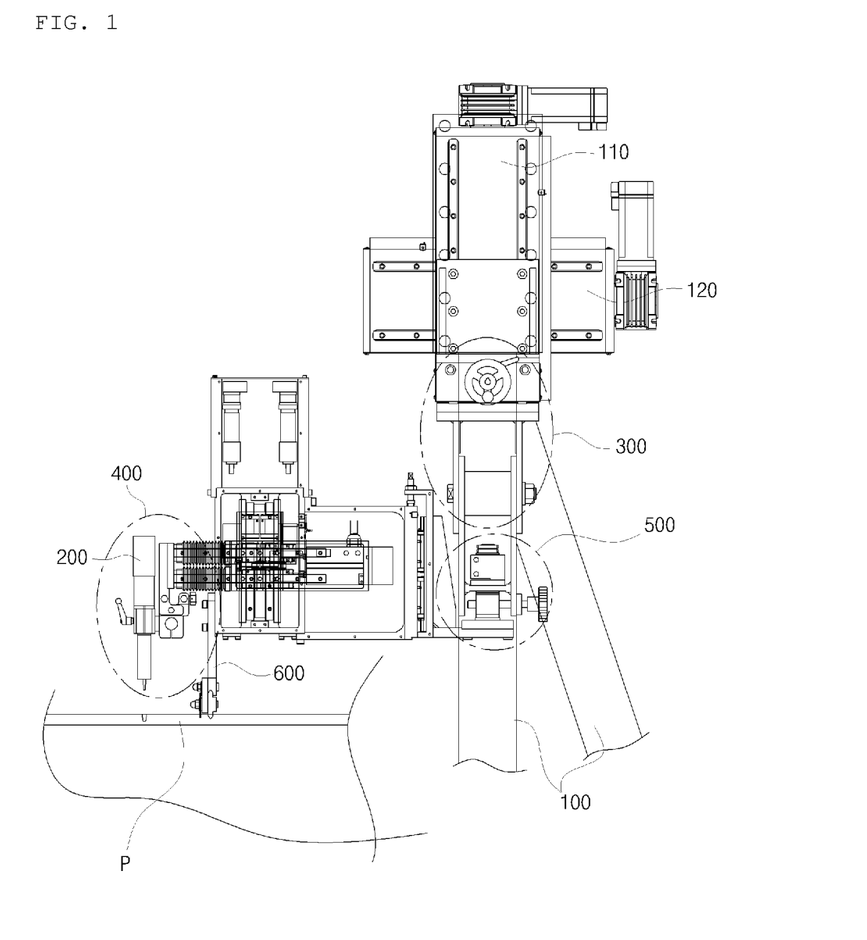
FIG. 1 is a side view showing a pipe welding apparatus according to an exemplary embodiment of the present invention.

As illustrated in FIG. 1, a pipe welding apparatus according to an exemplary embodiment of the present invention includes: a support 100, a torch 200, a first rotation part 300, a second rotation part 400, a third rotation part 500 and a sensor 600.

The support 100 is fixed to the ground and supports the torch and other devices included in the present invention. Also, a vertical slide device 110 and a horizontal slide device 120 are provided so that the torch 200 can vertically and horizontally move.

The torch 200 is supported by the support 100 and is formed to correspond to a welding portion of a pipe (P) so as to perform a welding operation of the pipe (P).

The first rotation part 300 rotates the torch 200 in a circumference direction of the pipe (P) up to a predetermined angle.

The second rotation part 400 rotates the torch 200 in an axial (length) direction of the pipe (P) up to a predetermined angle.

The third rotation part 500 rotates horizontally the torch 200 on the pipe (P) up to a predetermined angle so that the torch 200 is disposed at a welding line of the pipe (P).

The sensor 600 is provided at the support 100 and is in contact with the pipe (P) to enable the torch 200 to be disposed at an initial welding position of the pipe (P).

Figure 2:
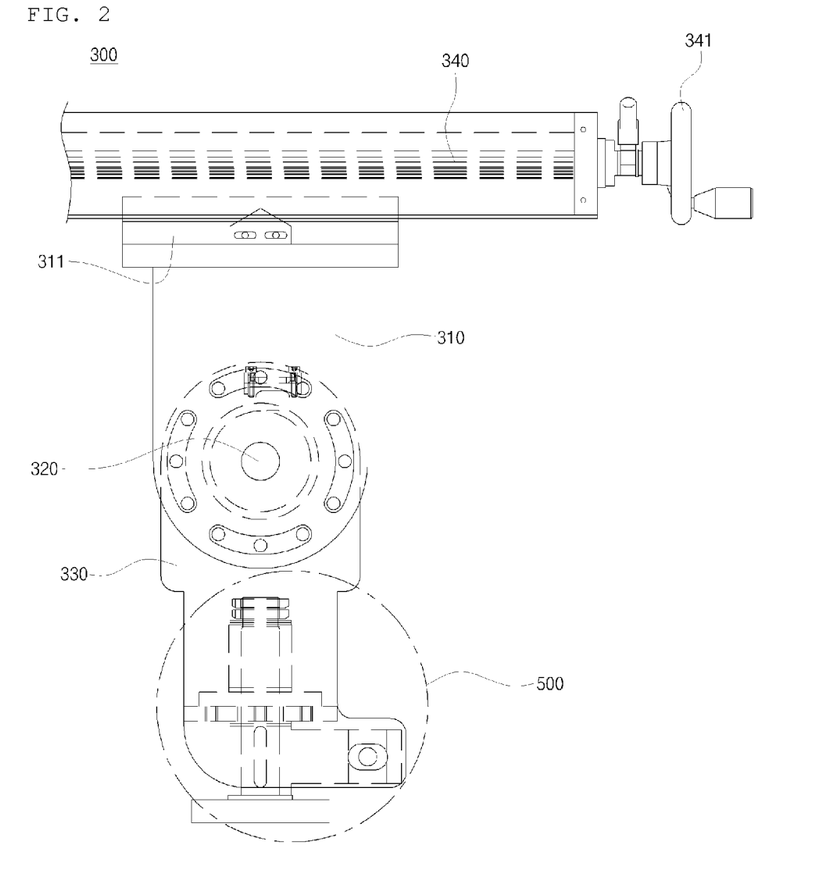
FIG. 2 is a side view showing a first rotation part which forms the pipe welding apparatus according to the exemplary embodiment of the present invention.
Figure 3:
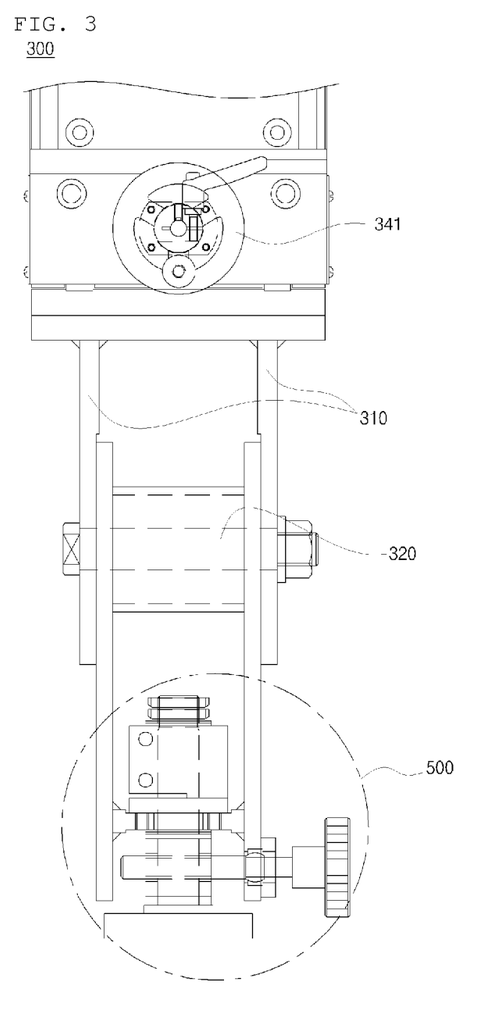
FIG. 3 is a front view showing the first rotation part which forms the pipe welding apparatus according to the exemplary embodiment of the present invention.

As illustrated in FIG. 2 and FIG. 3, the first rotation part 300 includes: an outer bracket 310; a rotating axis 320; an inner bracket 330; and a bracket guide 340.

The outer bracket 310 is configured such that a guide connection member 311 is provided to one side thereof, so the outer bracket performs a horizontal reciprocating motion depending on to the bracket guide 340. Also, the rotating axis 320 becomes the center of rotation of the inner bracket 330. Also, the inner bracket 330 is hinge-connected to the outer bracket around the rotating axis 320. Also, the bracket guide 340 includes a guide lever 341.

Figure 4:
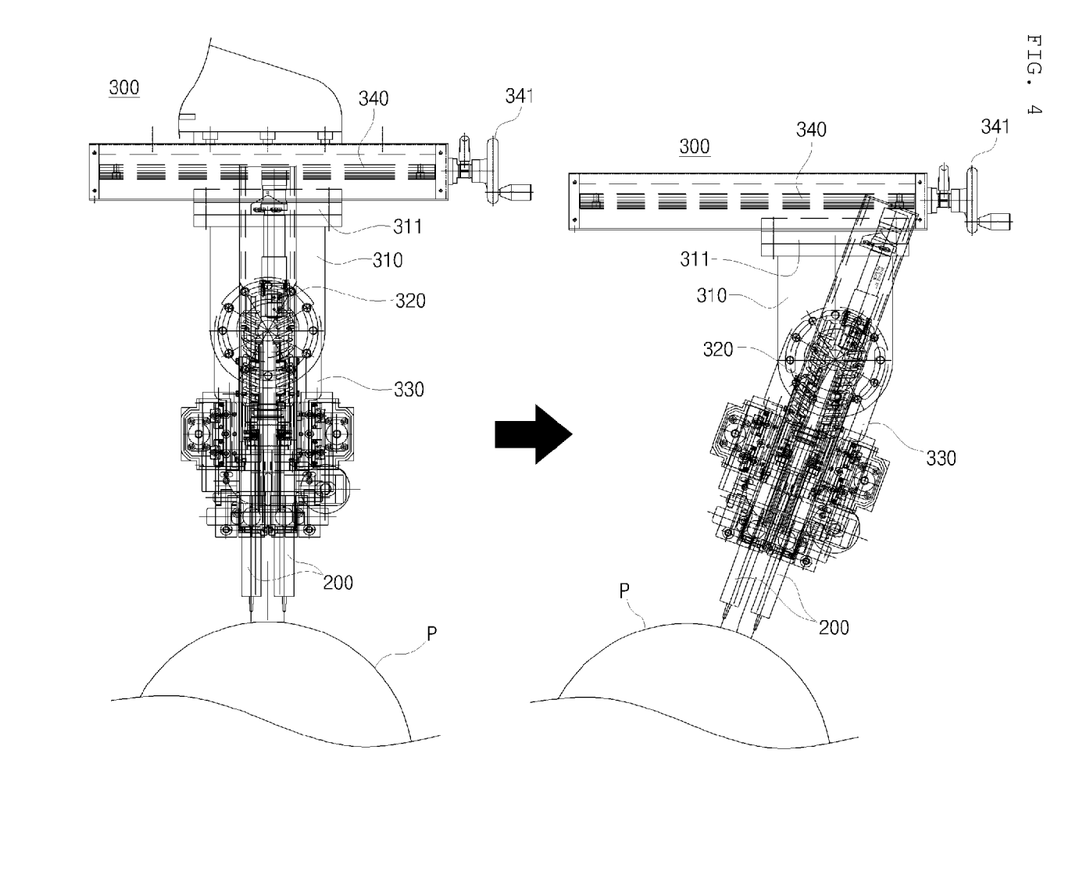
FIG. 4 is a side view showing a movement of the first rotation part which forms the pipe welding apparatus according to the exemplary embodiment of the present invention.

An operation of the first rotation part 300 is performed as illustrated in FIG. 4.

When the guide lever 341 is rotated, the bracket guide 340 guides the guide connection member 311 while rotating, so the outer bracket 310 is linked with the bracket guide 340 to move in a straight line. Thus, the inner bracket 330 rotates the torch 200 around the rotating axis 320 in the circumference direction of the pipe (P) up to a predetermined angle so that an angle required for a welding operation can be adjusted in the circumference direction of the pipe (P).

Figure 5:
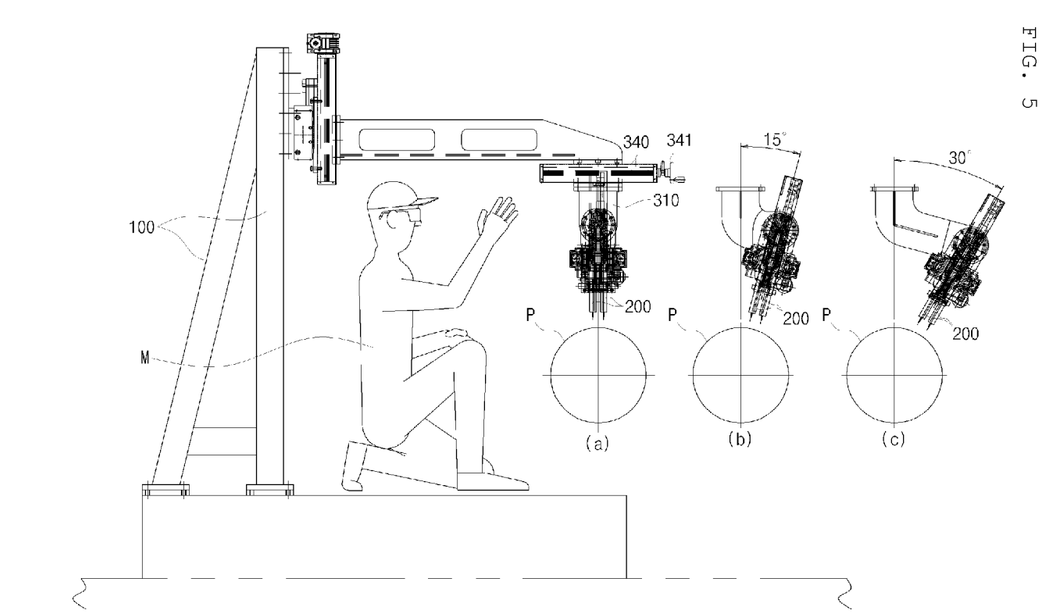
FIG. 5 is a side view showing the separation of an outer bracket included in the first rotation part which forms the pipe welding apparatus according to the exemplary embodiment of the present invention.

Like (a), (b) and (c) illustrated in FIG. 5, the outer bracket 310 is configured in various shapes and is detachable to the pipe welding apparatus by a worker (M). Accordingly, when a shape of the outer bracket 310 is changed, the torch may be disposed at each suitable position depending on a position, a diameter and the like of the pipe (P).

Figure 6:
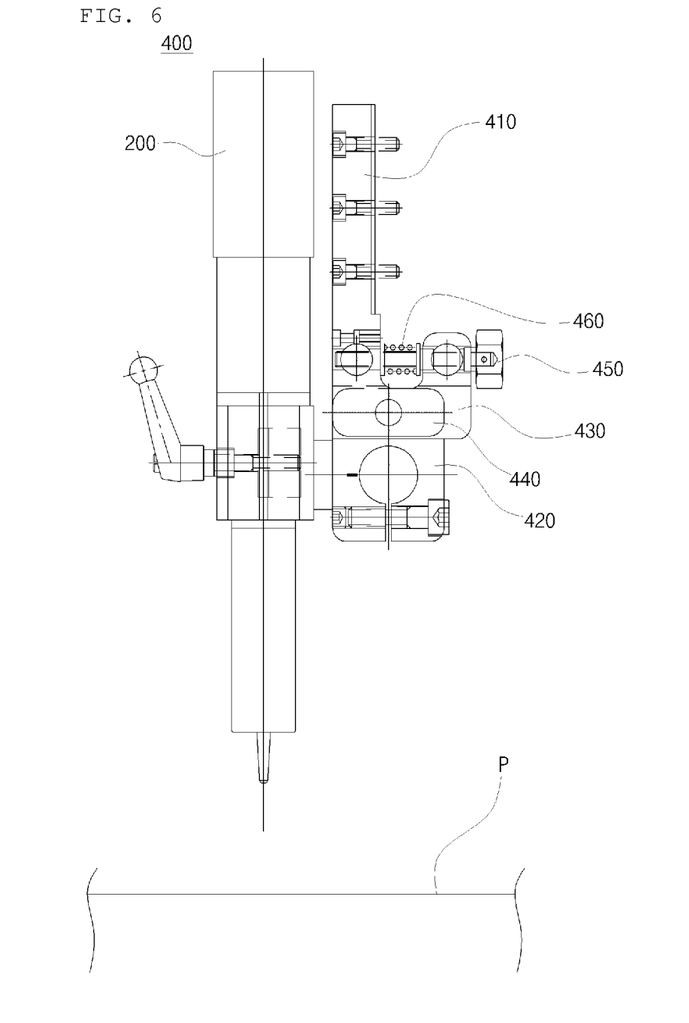
FIG. 6 is a side view showing a second rotation part which forms the pipe welding apparatus according to the exemplary embodiment of the present invention.

As illustrated in FIG. 6, the second rotation part 400 includes: a fixing member 410; a second rotation connecting member 420; a screw fixation member 430; a central member 440; a second rotation part bolt 450; and an elastic member 460.

The fixing member 410 is attached to the support (reference numeral 100 in FIG. 1). Also, the second rotation connecting member 420 connects the torch 200 and the fixing member 410. Also, the screw fixation member 430 is connected to the fixing member 410. Also, the central member 440 becomes a center of rotation. Also, the second rotation part bolt 450 is formed to pass through the fixing member 410 and the screw fixation member 430 and provides a welding force so that the fixing member 410 rotates around the central member 440. Also, the elastic member 460 is provided on an outer circumference surface of the second rotation part bolt 450 and provides stress so that the second rotation part bolt 450 maintains a certain torque. At this time, the elastic member 460 is made of a general spring, elastic rubber and the like.

Figure 7:
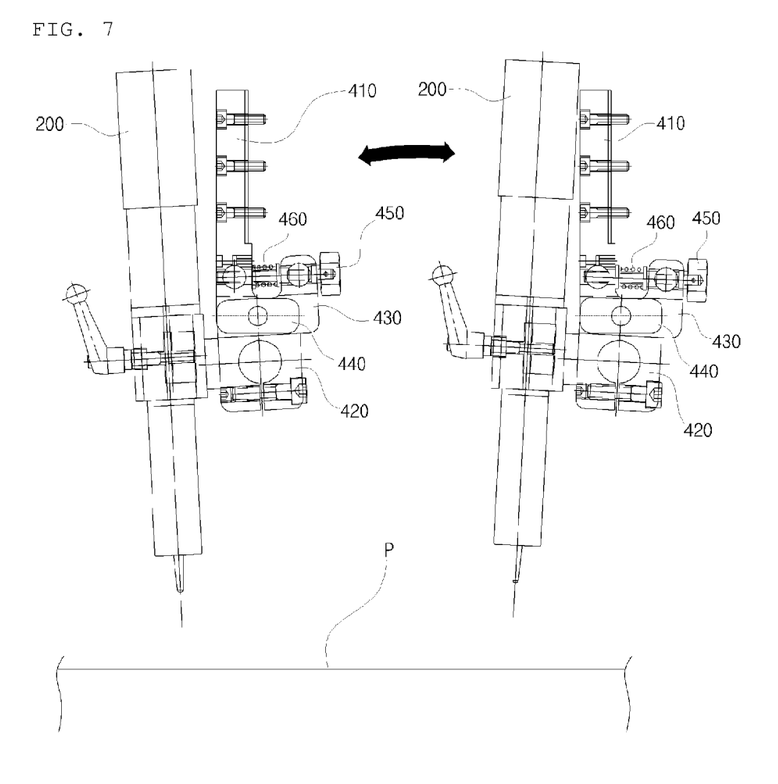
FIG. 7 is a side view showing a movement of the second rotation part which forms the pipe welding apparatus according to the exemplary embodiment of the present invention.

An operation of the second rotation part 400 is performed as illustrated in FIG. 7.

The fixing member 410 and second rotation part connecting member 420 integrally connected to the rotation part bolt around the central member 449 minutely rotate. Thus, the torch 200 rotates in an axial direction of the pipe (P). Also, the rotation direction of the torch 200 may be also adjusted according to a rotation direction of the second rotation part bolt. As one example, in FIG. 7, a state in which the torch rotates up to about 3° in a clockwise direction and a counterclockwise direction is illustrated, but the angle may be variously adjusted by the second rotation part bolt.

Figure 8:
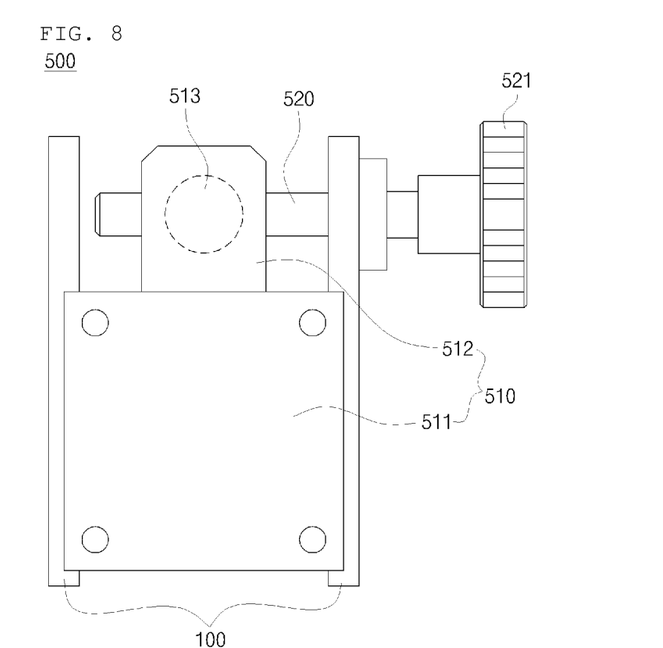
FIG. 8 is a plane view showing a third rotation part which forms the pipe welding apparatus according to the exemplary embodiment of the present invention.

As illustrated in FIG. 8, the third rotation part 500 includes a third rotation part connecting member 510 and a third rotation part bolt 520.

The third rotation part connecting member 510 includes: a first connection member 511 connected to the torch (reference numeral 200 in FIG. 1); and a second connection member 512 for connecting the first connection member 511 and the third rotation part connecting member 510. Also, the third rotation part bolt 520 is provided to pass through the support and provides a welding force to rotate the torch, including a rotation lever 520 provided to one side.

Figure 9:
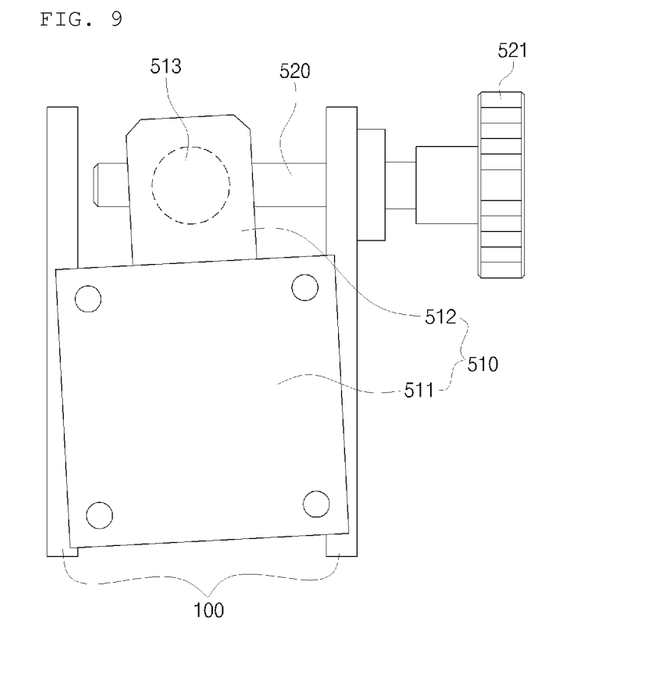
FIG. 9 is a plane view showing a movement of the third rotation part which forms the pipe welding apparatus according to the exemplary embodiment of the present invention.

An operation of the third rotation part 500 is performed as illustrated in FIG. 9.

When the rotation lever 520 is rotated, the second connection member 512 connected to the third rotation part bolt 520 rotates horizontally, and in connection with this, the first connection member 511 also rotates horizontally. Thus, the torch connected to the first connection member 511 rotates in a horizontal direction.

At this time, a third rotation part nut 513 is provided in an inner part of the second connection member 512, and the third rotation part bolt 520 passes through it. Accordingly, as the third rotation part bolt 520 rotates, horizontal rotation the entire of the third rotation part connecting member 510 is guided around the first connection member 511.

When the pipe is incorrectly arranged in the aforesaid way, the torch may be disposed at a welding position by rotating it in a horizontal direction.

As illustrated in FIG. 10 to FIG. 13, the sensor 600 includes: a contact part 610, an elastic member 620, a limit switch 630, a switch operator 640 and a torch supporting part 650.

Figure 10:
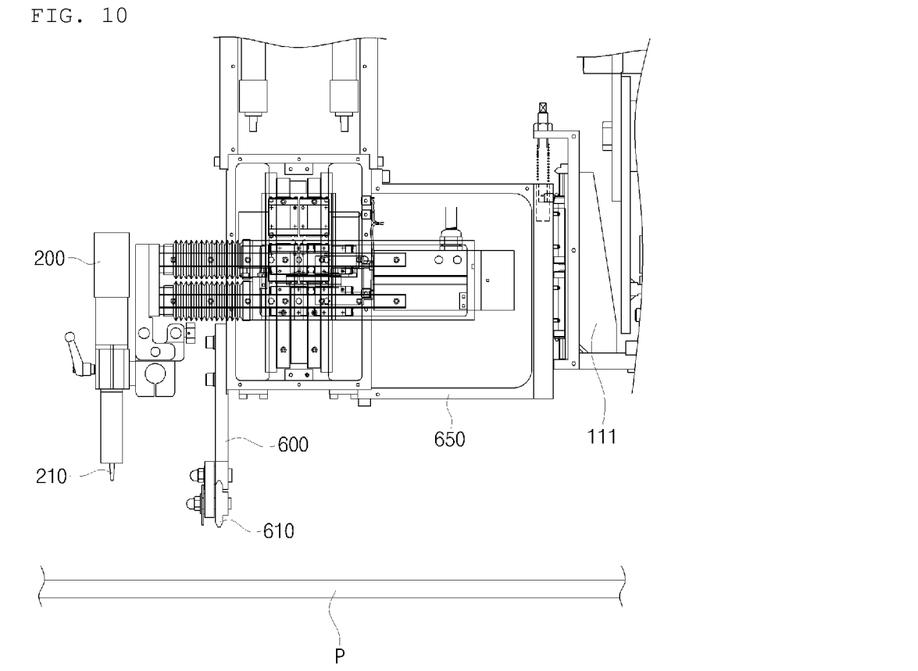
FIG. 10 through FIG. 12 are side views showing the operation process of a sensor which forms the pipe welding apparatus according to the exemplary embodiment of the present invention.

An operating process of the sensor 600 is as follows. First, as illustrated in FIG. 10, the contact part 610 and the limit switch part 630 are integrally connected to the torch supporting part 650 and are moved as the torch supporting part 650 is vertically moved on the support 100.

Figure 11:
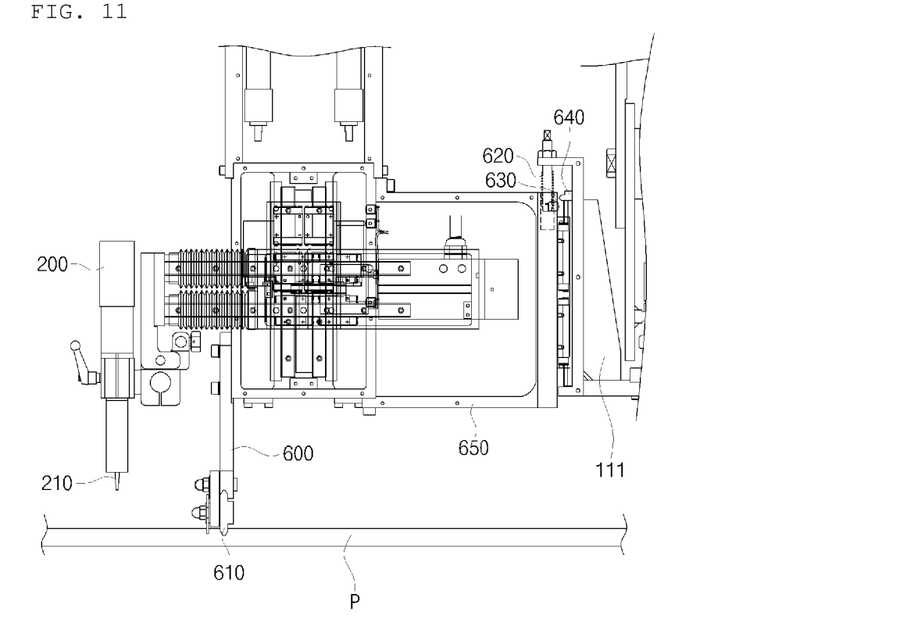

Next, as illustrated in FIG. 11, when the contact part 610 is in contact with the pipe (P) by descending according to the drive of the vertical slide device 110, the contact part 610 is stopped. At this time, because there is a predetermined spaced distance between the contact part 610 and a torch end part 210, when the contact part 610 comes into contact with the pipe, the torch is disposed at the initial welding position of the pipe.

Figure 12:
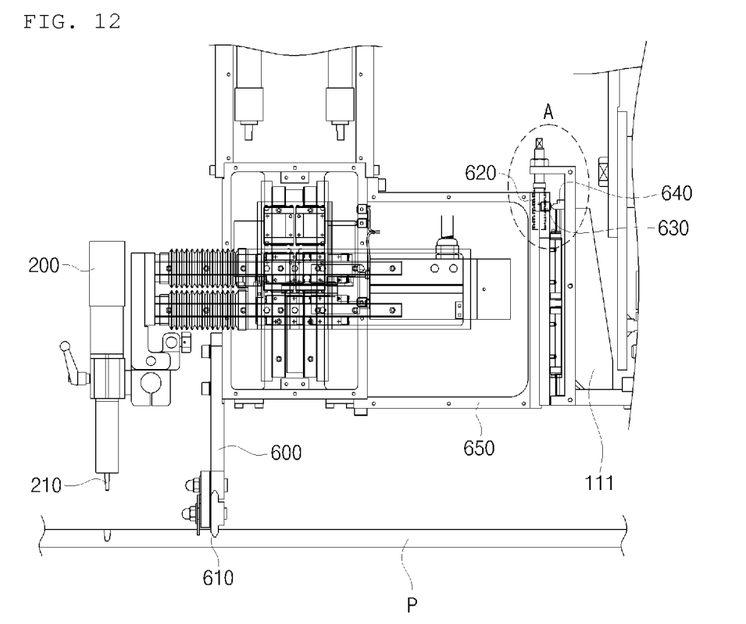

Last, as illustrated in FIG. 12, a vertical slide 111 continues to descend, and the switch operator 640 attached to the vertical slide 111 is placed at a same position as the limit switch 630. The elastic member 620 made of a spring and the like provides elasticity which is appropriate for a smooth vertical movement and reduction in the shock of the sensor 200 and the torch 200 which moves up and down.

Figure 13:
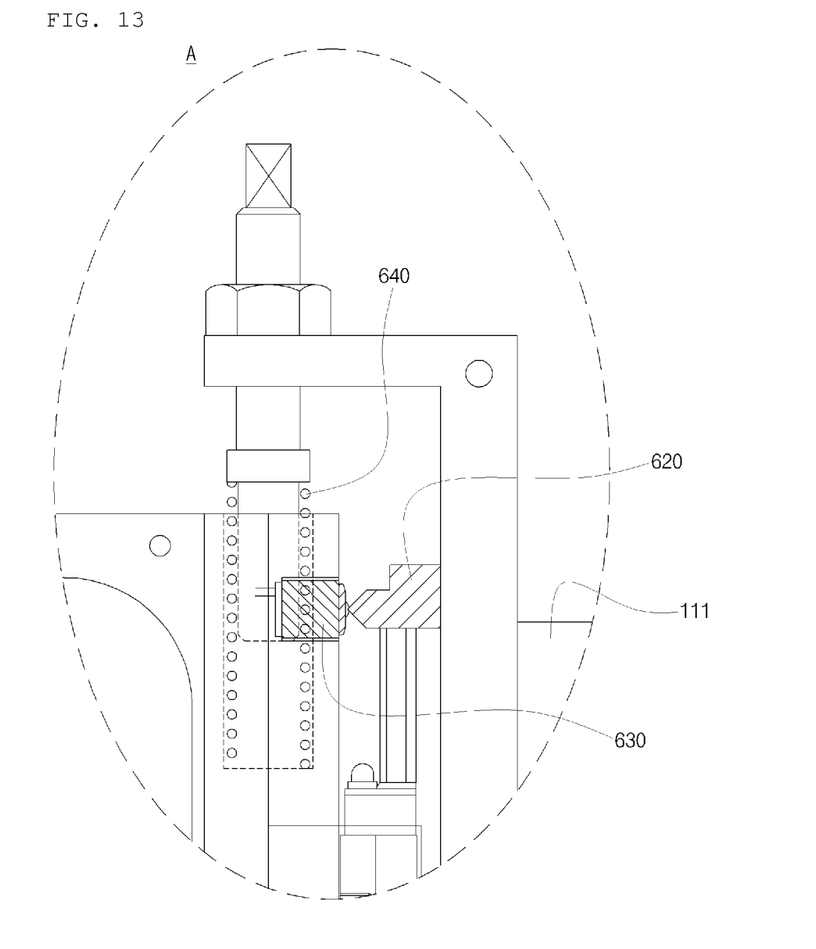
FIG. 13 is an enlarged view showing a part of the sensor which forms the pipe welding apparatus according to the exemplary embodiment of the present invention.

At this time, as illustrated in FIG. 13, the switch operator 640 operates the limit switch 630 by pressurizing it. The drive of the vertical slide device 110 is stopped by the operation of the limit switch 630.

By the aforesaid process, the sensor 600 comes into contact with the pipe P, thereby enabling the torch to be disposed at the initial welding position of the pipe (P).

As previously described, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

The invention claimed is:

1. A pipe welding apparatus, comprising:
   a support fixed to the ground;
   a torch which is supported by the support and is formed to correspond to a welding portion of a pipe;
   a first rotation part for rotating the torch in a circumferential direction of the pipe up to a predetermined angle; and
   a second rotation part for rotating the torch in an axial direction of the pipe up to a predetermined angle,
   wherein the first rotation part comprises an outer bracket which performs a horizontal reciprocating motion along a guide provided at the support and an inner bracket which is hinge-connected to the outer bracket around a rotating axis, and
   wherein the second rotation part comprises: a fixing member attached to the support; a second rotation part connecting member for connecting the torch and the fixing member; a screw fixation member connected to the fixing member; a central member which becomes a center of rotation; and a second rotation part bolt which is formed to passing through the fixing member and the screw fixation member and provides a welding force so that the fixing member rotates around the central member.

2. The pipe welding apparatus of claim 1, wherein the outer bracket is detachably formed at the support.

3. The pipe welding apparatus of claim 1, wherein the second rotation part further comprises an elastic member formed on an outer circumference surface of the second rotation part bolt.

4. The pipe welding apparatus of claim 1, further comprising a third rotation part for horizontally rotating the torch on the pipe up to a predetermined angle.

5. The pipe welding apparatus of claim 4, wherein the third rotation part comprises: a third rotation part connecting member formed to be connected to the torch; and a third rotation part bolt which is formed to pass through the support and rotates the torch by providing a welding force to the third rotation part connecting member.

6. The pipe welding apparatus of claim 1, further comprising a sensor which is formed at the support and enables the torch to be disposed at an initial welding position of the pipe.

7. The pipe welding apparatus of claim 1, wherein the sensor comprises: a torch supporting part which supports the torch and moves up and down on the support; a contact part which is formed at the torch supporting part to be linked with it and comes into contact with an outer surface of the pipe; and a limit switch which is formed at the torch supporting part and enables a vertical movement of the torch supporting part to be stopped when the torch is disposed at the initial welding position of the pipe.

* * * * *